United States Patent [19]

Sohrabi

[11] 4,157,473

[45] Jun. 5, 1979

[54] SIMPLIFIED FAST NEUTRON DOSIMETER

[75] Inventor: Mehdi Sohrabi, Atlanta, Ga.

[73] Assignee: The United States of America as represented by the United States Department of Energy, Washington, D.C.

[21] Appl. No.: 638,899

[22] Filed: Dec. 8, 1975

[51] Int. Cl.$^2$ .............................. G01T 5/02; G01T 3/00
[52] U.S. Cl. ...................................... 250/473; 250/391; 250/472
[58] Field of Search ............... 250/472, 473, 474, 475, 250/477, 390, 391

[56] References Cited

U.S. PATENT DOCUMENTS

| | | | |
|---|---|---|---|
| 3,509,339 | 4/1970 | Doehner | 250/475 X |
| 3,529,157 | 9/1970 | Johnston et al. | 250/473 |
| 3,612,871 | 10/1971 | Crawford et al. | 250/472 |
| 3,663,815 | 5/1972 | Cross et al. | 250/473 |
| 3,852,134 | 12/1974 | Bean | 250/472 X |

Primary Examiner—Archie R. Borchelt
Attorney, Agent, or Firm—Dean E. Carlson; Randall G. Erdley

[57] ABSTRACT

Direct fast-neutron-induced recoil and alpha particle tracks in polycarbonate films may be enlarged for direct visual observation and automated counting procedures employing electrochemical etching techniques. Electrochemical etching is, for example, carried out in a 28% KOH solution at room temperature by applying a 2000 V peak-to-peak voltage at 1 kHz frequency. Such recoil particle amplification can be used for the detection of wide neutron dose ranges from 1 mrad. to 1000 rads. or higher, if desired.

5 Claims, 4 Drawing Figures

SIMPLIFIED FAST NEUTRON DOSIMETER

BACKGROUND OF THE INVENTION

1. Field of the Invention

The present invention relates to neutron dosimetry and more particularly, to a simplified fast neutron dosimeter utilizing a polycarbonate film and electrochemically etching the same.

2. Description of the Prior Art

A need exists for a fast-neutron dosimeter that is low in cost, easily used, small in size, tissue equivalent in composition, sensitive to neutrons and insensitive to beta, gamma, and x-rays, having a wide dose range, and being relatively insensitive to ambient conditions such as humidity and temperature, thereby having a low fading rate. To be truly practical, the device must also be capable of being easily read so that detected neutron doses may be evaluated with ease.

During the past decade a number of efforts have been made to reach these goals. In particular, track etching methods have been attempted in neutron dosimetry. One such method of neutron dosimetry using track etching techniques in personnel dosimetry has been the use of fissionable materials such as 237Np and 232Th in contact with a 10 μm thick polycarbonate foil (such as KIMFOL) glued on a LUCITE "O" ring. These foils are etched in a 28% KOH solution at 60° C. and the etched perforated track density is determined using a spark counting technique. This method, which involves the combination of fissionable material with plastic, has a number of advantages over earlier known proton track registration in special nuclear track emulsions; however it suffers from the disadvantage of the complexity and cost of using fissionable materials. Accordingly, simpler and more convenient techniques for use as dosimeters are still needed.

Electrochemical etching was introduced by Tommasino. The work of Tommasino was involved in the registration of fission fragment and alpha particle tracks and is described in CNEN Report RT/PROT (71), 1, 1970.

Further research in electrochemical etching was performed by the present Inventor at Oak Ridge National Laboratory wherein it was shown that large fission fragment tracks could be obtained in polyester materials (gamma film backing) by electrochemical etching in a 28% KOH solution with the application of 2000 V at 1 kHz frequency. Similar research relating to fast-neutron-induced recoil particle tracks was carried out with regard to certain other organic foils such as cellulose acetobutyrate (NTA film backing). The result of this research, however, was not considered to successfully achieve the goals set forth above of providing a truly satisfactory personnel dosimeter. Such work is reported in ORNL-TM-3605 (1971) entitled "Some Studies on the Application of Track Etching in Fast Neutron Personnel Dosimetry." In particular, the tracks observed in the cellulose foils had poor contrast and were not well defined. The lack of adequate track contrast and definition, of course, rendered the techniques under investigation of little value for commercial exploitation since the results obtained, although different in nature, were not substantially better than those obtainable by other well known prior art etching techniques.

A need was therefore seen to exist for further research and development toward the above established goals of producing a truly effective personnel neutron dosimeter as well as a dosimeter for general fact neutron dosimetry applications.

SUMMARY OF THE INVENTION

Accordingly, one object of the present invention is to provide an improved fast-neutron dosimeter.

Yet another object of the present invention is to provide an improved fast-neutron personnel dosimeter, a finger dosimeter or a patient monitor.

A still further object of the present invention is the provision of a fast-neutron dosimeter of low cost which is easily used, small in size, tissue equivalent in composition and sensitive to neutrons but insensitive to beta, gamma and X-rays, having a low fading rate, and having a wide dose range of interest in routine and accidental fast neutron personnel dosimetry.

Yet another object of the present invention is the provision of a dosimeter employing a polycarbonate film.

Yet another object of the present invention is the provision of a technique for amplifying recoil particle tracks in polymers as applied to fast neutron dosimetry.

Another object of the invention is a new method of using polycarbonate foils in fast neutron dosimetry.

Briefly, these and other objects of the invention are achieved by the use of a polycarbonate film as a material to be exposed for fast neutrons. This film is then electrochemically etched in a basic solution at temperatures ranging from 20° C.–60° C. using a voltage ranging from 100 V to 1500 V (RMS) at a frequency of from 20 Hz to 20 kHz, whereby the recoil particle tracks are substantially enlarged so as to be visible by the naked eye or through minimal magnification.

BRIEF DESCRIPTION OF THE DRAWING

A more complete appreciated of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

The electrochemical etching technique of Tommasino is based upon the conductive energy loss in tracks at high frequencies in a field of sufficient strength, resulting in local heating of the etchant. Using this etching technique, charged particle tracks are enlarged to such a size that they can be observed by the unaided eye.

Figure 1:
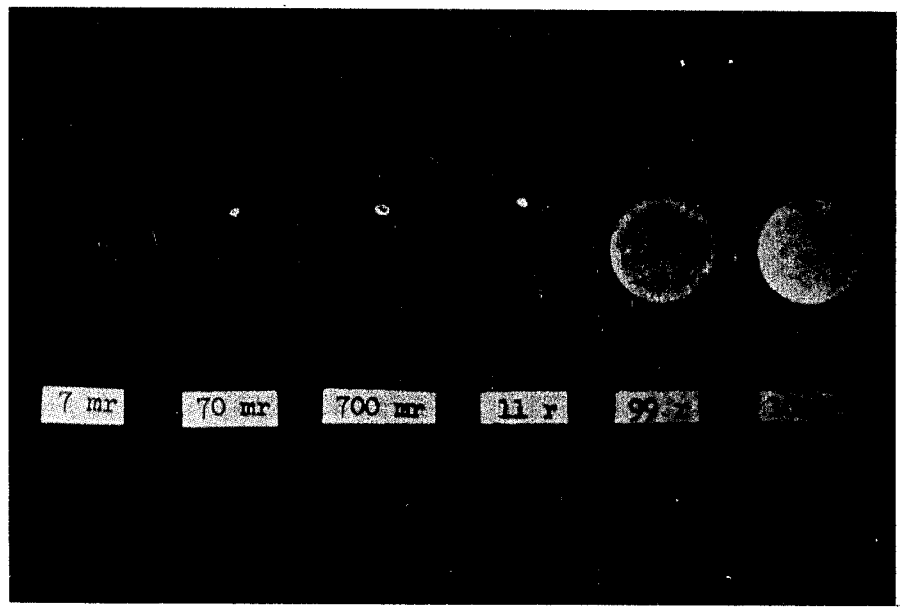
FIG. 1 is a photograph of fast-neutron-induced recoil particle tracks in 375 μm thick polycarbonate foils exposed to different doses of fission neutrons after etching for 14 hours in 28% KOH solution at room temperature using 2000 V at 1 kHz.

One of the most significant aspects of the present invention is the discovery of the unique characteristics of polycarbonate foils in the amplification by electrochemical etching of fast-neutrons induced recoil particle tracks. Research in electrochemical etching enhancement of recoil particle tracks was carried out with such polymers as cellulose acetate, cellulose triacetate, polycarbonate, cellulose aceteobutyrate, and cellulose nitrate, materials which are often considered for charged particle registration. It was found that although electrochemical etching was effective in those materials, the resulting etched tracks in materials other than polycarbonate had poor contrast and were not well defined as those in polycarbonate. It was discovered, however, that polycarbonate foils were highly sensitive to electrochemical etching and readily provided discreet, clearly identifiable, high contrast recoil particle tracks of greatly enlarged sizes under many etching conditions applied, to the extent they could be viewed with the naked eye, as shown in FIG. 1. This provides extension of neutron dose range down to low doses of interest for routine fast neutron personnel dosimetry. Therefore, neutron dosimetry by this approach covers a wide dose range of interest for routine and accidental fast neutron personnel dosimetry.

It is noted that publications such as Blanford et al. (Radiation Effects, June 1970, Vol. 3, pp. 263-266) have described the used of chemical etching techniques with polycarbonate films to detect fission fragments or ions, but not neutron radiation. Similarly, U.S. patents to Alter and Fleischer et al. (U.S. Pat. Nos. 3,457,408 and 3,770,962 respectively) disclose methods of detecting neutron radiation using polycarbonate films, but do not disclose the use of electrochemical etching techniques for track amplification. None of these publications disclose the unique enhancement of fast-neutron induced recoil particle tracks that is obtainable when polycarbonate foils are etched using the proper electrochemical techniques.

Referring now to FIG. 1, fast-neutron-induced recoil particle tracks in 375 $\mu$m thick polycarbonate foils exposed to different doses of fission neutrons are shown after proper etching. The photograph of FIG. 1 shows six separate circular polycarbonate foils exposed to radiation doses from 7 mrads to 1020 rads, a range of nearly 6 orders of magnitude in exposure. In the photograph, the individual particle tracks amplified by appropriate electrochemical etching techniques are clearly visible as individual points and, when densities are adequately low, can clearly be counted with minimal magnification by the unaided human eye. Furthermore, orders of magnitude in radiation exposure are clearly evident to the unaided human eye by observation of the general change in contrast or surface coloration of the polycarbonate foil elements. The latter effect is clearly apparent in FIG. 1 wherein a distinct change in surface coloration from primarily transparent at low radiation exposures to primarily light or white at high radiation exposures is apparent. Therefore, any unexperienced eye can sort a number of foils according to the neutron doses they have received.

Figure 2:
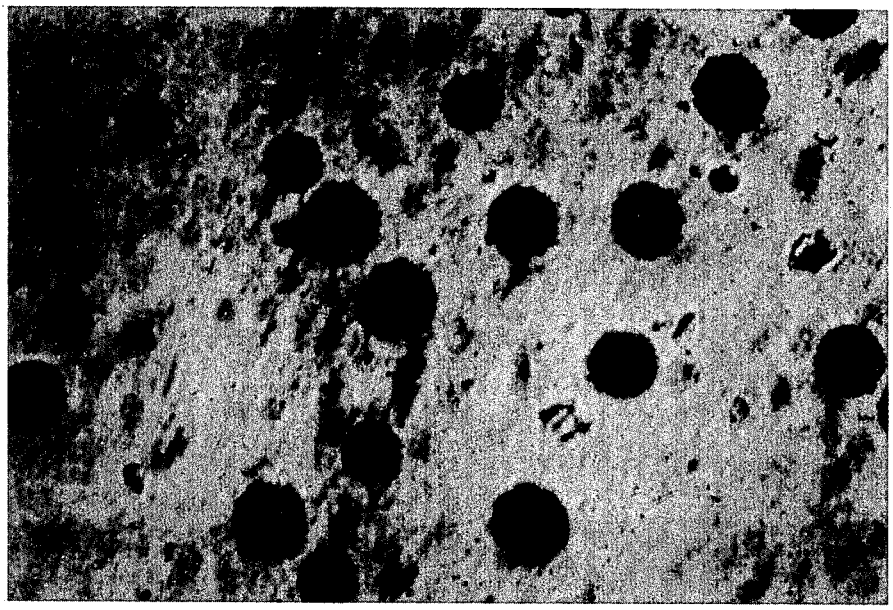
FIG. 2 is a photomicrograph of recoil particle tracks in 125 μm thick polycarbonate etched for 2.5 hours in 28% KOH solution at room temperature using 2000 V at 1 kHz (X78)

FIG. 2 is a micrograph with magnification of 78 illustrating more clearly the size and shape of the etched recoil particle tracks in 125 $\mu$m thick polycarbonate etched for 2.5 hours in a 28% KOH solution at room temperature using 2000 V at 1 kHz. It will be apparent to those skilled in the art from the micrograph FIG. 2 that the recoil particle tracks are enormously amplified by electrochemical etching in polycarbonate films to the extent that they can be unambiguously observed and counted with little or no magnification. Thus the use of polycarbonate films together with electrochemical etching techniques results in a substantial improvement over use of conventional etching techniques, which result in only slight amplifications of recoil particle tracks to the extent that they can be counted only with the use of microscopes and high magnification (e.g., X 1000), and also provides a great improvement over electrochemical etching techniques used with materials other than polycarbonate, which provide somewhat enlarged but not clearly defined recoil particle tracks. Furthermore, polycarbonate possesses many good dosimetric characteristics such as low fading rate.

Figure 3:
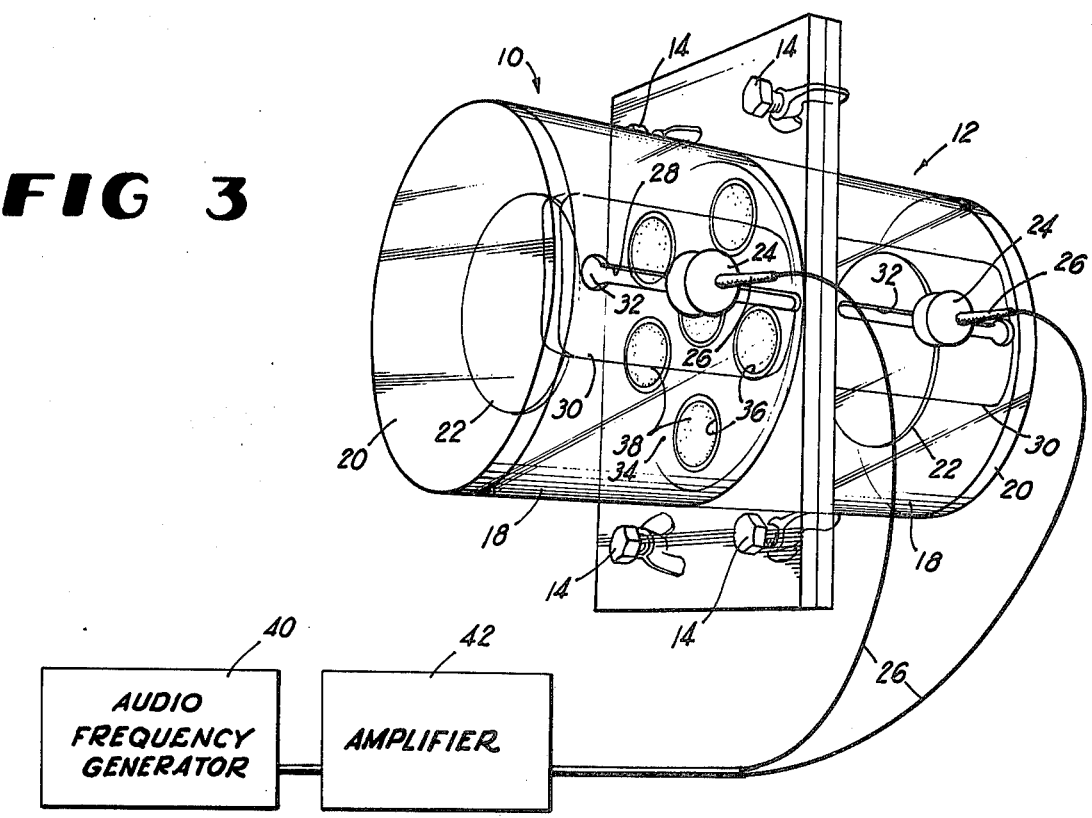
FIG. 3 is a perspective illustration of an electrochemical etching chamber used for etching of foils in accordance with the present invention.

An improved electrochemical etching chamber was developed for performing the electrochemical etching operation in accordance with the present invention to process 6 foils simultaneously. This chamber is illustrated in FIG. 3, and is formed entirely of transparent LUCITE plastic to permit direct observation of the etching in foils with time as it takes place, although the material could equally well be made of other equivalent plastic, or non-conducting materials of a transparent or non-transparent nature which are not effected by the etching operation. Of course, the chamber can also be made in different designs or for different mounting procedures to etch more or less number of foils if necessary.

The electrochemical etching chamber includes two identical halves 10 and 12 which are held together by a plurality of wing nuts 14. Each half chamber includes a mounting plate 16 including suitable apertures through which the wing nuts 14 pass. The mounting plates are flat, rectangular blocks, which may be compressed firmly together in a sealing relationship by the wing nuts 14. Each mounting plate 16 includes a plurality of apertures 36, six in number for example and arranged in a circular fashion. A cylindrical chamber 18 is secured to each of the mounting blocks 16 in a fluid-tight fashion. The end of each chamber 18 adjacent to the mounting plate 16 is open, and corresponds to an identical opening in each of the mounting plates so that the chambers 18 are effectively open to one another when the mounting plates 16 are fastened together and when no foils are present between them. The end of each chamber facing away from the mounting plate 16 is closed by a suitable end plate 20.

Each chamber 18 includes a disc-shaped electrode 22 which may be formed of stainless steel, platinum or palladium and which is coupled to an external voltage source by means of a high voltage electrical connector 24 and an appropriate high voltage line 26. The electrical connectors 24 are movably mounted in appropriate slots 28 formed in reinforcing panels 30 secured to outer peripheral portions of the cylindrical chambers 18. A slidable liquid tight gasket 32 is provided within each of the cylindrical chambers 18 adjacent the slots 28 to maintain a liquid-tight seal along the slots 28.

A foil support 34, preferably of disc shape and formed of a suitable insulating material is positioned between the mounting plates 16 to electrically isolate the chambers 18 from one another. The foil support includes a plurality of apertures 36, preferably which are illustratively shown as being six in number and arranged in a circular fashion around the foil support 34. A plurality of disc-shaped polycarbonate foils 38 are mounted within the apertures 36 by means of O-rings secured around each aperture 36 so that during the etching process, one surface of each foil is exposed to each of the chambers 18.

A suitable conventional audio frequency generator 40, preferably having a variable output frequency of reasonably good stability is coupled through a conventional push-pull amplifier 42 to the high voltage lines 26 to provide the desired signal power to the palladium electrodes 22. The chambers 18 are preferably filled with a suitable etchant solution, such as a KOH solution maintained at approximately room temperature.

Having now described the apparatus and the basic concepts of the invention, specific examples of the etching techniques utilized in accordance with the invention will now be presented.

EXAMPLE 1

LEXAN polycarbonate foils in the shape of round discs two centimeters in diameter were first punched out of a plane sheet of material. The foils had been exposed to fast neutrons of different intensities. The irradiated foils were placed in a foil support of the type illustrated at 34 in FIG. 3 in an etching chamber of the type described. The chamber was subsequently filled with a 28% KOH etchant solution at room temperature. Two palladium electrodes wre placed in the etching chamber and 2000 V (peak-to-peak) at 1 kHz were applied across the electrodes.

Etching was carried out using different thicknesses of polycarbonate foils, and the etching time was varied depending upon the thickness of the foils. For example, 125 $\mu$m thick foils were etched for 2 hours, 250 $\mu$m foils were etched for 4 hours, and 375 $\mu$m foils were etched for 14 hours.

After the etching was completed, the electrodes were removed, the etchant was removed, and the containers were washed with water. The irradiated and etched foils were then removed from the etching chamber, washed, dried in open air and the recoil particle track densities were determined.

EXAMPLE 2

The same conditions and same apparatus were used as set forth in Example 1 with the exception that the electrode voltage was set by 800 V (RMS) and the frequency was set at 2 kHz. These settings are considered optimum and constitute the preferred method of practicing the etching technique of the invention. However, the conditions can be changed depending on the desired etching results and type of application.

EXAMPLE 3

The same conditions and same apparatus were used as set forth in Examples 1 and voltage and frequency of Example 2 with exception that the etchant ws 45% KOH concentration. With this aproach the sensitivity was improved.

VARIATIONS OF EXAMPLES

Many variations in the above-recited exemplary procedures were tried. For example, different etchant solutions and different etchant concentrations were used. KOH and NaOH solutions have been utilized with the percent concentration varying from 10% to 50% by weight. Many different thicknesses of polycarbonate materials were used ranging from 75 $\mu$m to 500 $\mu$m. The voltages applied has varied from 100 volts to 1500 volts (RMS). The signal frequency was varied from 20 Hz to 20 kHz. Etching was found to be efficient at temperatures as low as 20° C. and as high as 60° C., although etching speed was enhanced by increasing the temperature of the etchant; with a 250 $\mu$m thick polycarbonate foil etched in a 28% KOH solution at 25° C. utilizing a 800 V (RMS) 2 kHz signal, it took from 4–5 hours for the etching to be completed but under the same conditions except that the temperature was raised to 60° C., the etching took 47 minutes to be completed. The duration of the etching period and mean track diameter were found to depend strongly upon the thickness of the polycarbonate foil used.

Figure 4:
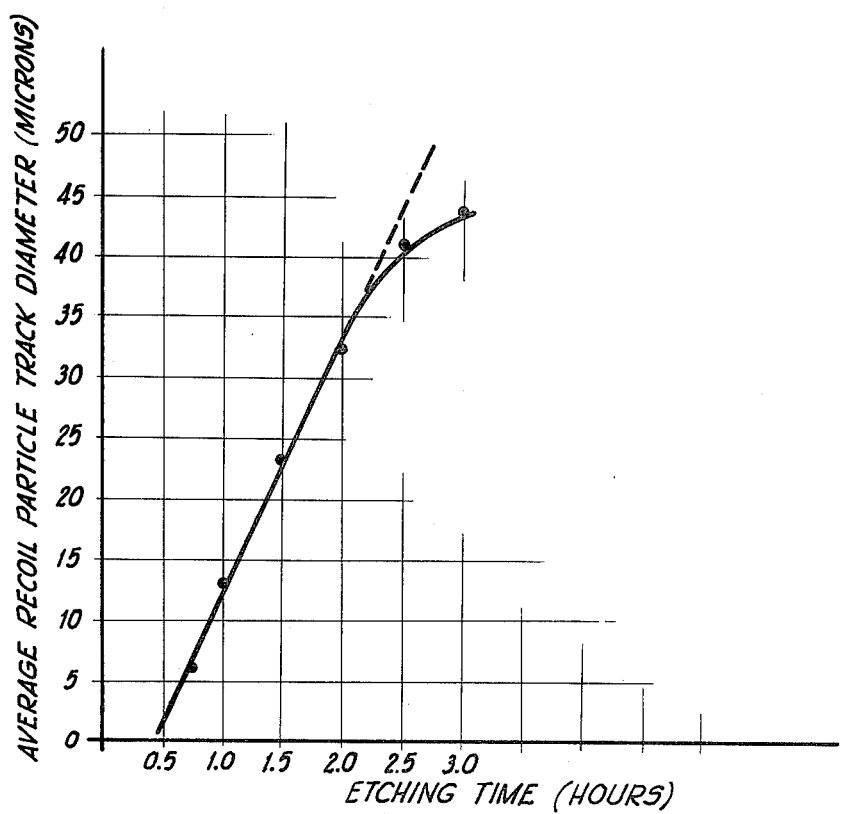
FIG. 4 is a graphical illustration of average recoil particle track diameter versus etching time.

The average diameter of the recoil particle tracks amplified by the above-described etching techniques is a function of the etching time and other parameters mentioned above. FIG. 4 illustrates the functional relationship between etching time and average recoil particle track diameter using a 125 $\mu$m thick polycarbonate foil exposed to 10 rads of fission neutrons. The polycarbonate foil was etched in a 28% KOH solution at room temperature using 2000 volts at 1 kHz.

The polycarbonate foil and etching technique of the present invention provides a number of advantages as applied to personnel dosimetry. First, the dosimeter is fast-neutron sensitive but is insensitive to gamma, beta and X-rays. Second, the particle recoil tracks have such high contrast and clear definition that at low neutron doses, track density can be obtained easily by projecting an image of the foil on a microfiche screen. The tracks appear as approximately 0.5 centimeter spots on a microfiche screen and the track density as a function of neutron dose may be obtained simply by counting the tracks on the screen. Above 10 rads, for example, the overall coloration or optical density varies linearly with radiation dosage. Thus, dosimetry can be monitored by conventional automated optical density measurements. Furthermore, the apparatus and technique of the present invention provides extremely wide ranges, that is, for doses as low as 1 mrad. and as high as 1000 rads or higher. In addition, polycarbonate is hard material, usually homogenous, and has no objectionable environmental influences, thus providing good reproducibility in all measurements. In addition, polycarbonate has good latent track stability. It has been found, for example, that no fading of tracks was observed even after long-term storage of the irradiated material at normal room conditions.

Other advantages of polycarbonate include the fact that it is a tissue-equivalent composition and is commercially available. Furthermore, the method of the present invention requires no dark room processing and does not require the use of any fissionable material in the dosimeter. Such a dosimeter is ideal for a variety of applications.

Dosimeters formed of polycarbonate materials can be made to have consistent sensitivity independent of the angle between the foil and a neutron beam by wrapping a foil of the type described around a short LUCITE bar (1 cm in diameter, for example) in a semicircular fashion. Other approaches such as mounting two or three foils on a LUCITE cube can also be used to obtain omni-directional sensitivity.

Obviously, numerous modifications and variations of the present invention are possible in light of the above teachings. It is therefore to be understood within the scope of the appended claims, the invention may be practiced otherwise than as specifically described herein.

What is claimed is:

1. A method utilizing a polycarbonate foil in radiation dosimetry, comprising the steps of:

exposing said polycarbonate foil to a quantity of fast-neutron radiation for producing recoil particle tracks in said polycarbonate foil; and electrochemically etching said irradiated polycarbonate foil for substantially enlarging said recoil particle tracks by (a) immersing said irradiated polycarbonate foil in a basic etchant solution and (b) simultaneously subjecting said foil to a high voltage, ranging from 100 V (RMS) to 1500 V (RMS) and having a frequency range from 20 Hz to 20 kHz, whereby said quantity of fast neutron radiation may be readily determined.

2. The method as defined in claim 1 wherein the step of immersing further includes the step of:

maintaining said etchant solution at a temperature ranging from 20° C. to 60° C.

3. The method as defined in claim 1, wherein said step of immersing includes the step of:

placing said irradiated polycarbonate foil in a chamber containing said etchant solution such that both sides of said foil are exposed to said solution.

4. The method as defined in claim 1, wherein said step of immersing includes the step of:

using an alkalai halide solution as said etchant solution, the concentration of said solution ranging from 10% to 50% by weight of alkalai halide.

5. The method as defined in claim 4, wherein the step of immersing further includes the step of:

maintaining said etchant solution at a temperature ranging from 20° C. to 60° C.

* * * * *